United States Patent
Zeng et al.

(10) Patent No.: US 12,411,700 B2
(45) Date of Patent: Sep. 9, 2025

(54) ASSIGNING CONTROL AND VARIANTS TO DYNAMICALLY DEFINED TIME PERIODS IN APPLICATION STATE EXPERIMENTS

(71) Applicant: Maplebear Inc., San Francisco, CA (US)

(72) Inventors: Yixiang Zeng, Fremont, CA (US); Aneesh Mannava, San Francisco, CA (US); Bing Hong Leonard How, South San Francisco, CA (US); Zhongqiang Liang, Fremont, CA (US); Wenhui Zhang, Redwood City, CA (US); Lan Yu, Newark, CA (US)

(73) Assignee: Maplebear Inc., San Francisco, CA (US)

( * ) Notice: Subject to any disclaimer, the term of this patent is extended or adjusted under 35 U.S.C. 154(b) by 260 days.

(21) Appl. No.: 18/353,744

(22) Filed: Jul. 17, 2023

(65) Prior Publication Data
US 2025/0028540 A1    Jan. 23, 2025

(51) Int. Cl.
*G06F 9/451* (2018.01)
*G06F 11/34* (2006.01)

(52) U.S. Cl.
CPC .......... *G06F 9/451* (2018.02); *G06F 11/3409* (2013.01); *G06F 11/3438* (2013.01); *G06F 11/3466* (2013.01)

(58) Field of Classification Search
CPC .. G06F 9/451; G06F 11/3409; G06F 11/3438; G06F 11/3466
See application file for complete search history.

(56) References Cited

U.S. PATENT DOCUMENTS

| | | | |
|---|---|---|---|
| 10,949,217 B1* | 3/2021 | Nitsopoulos | G06F 9/4484 |
| 2016/0203797 A1* | 7/2016 | Pike | G06F 3/0489 715/781 |
| 2017/0097973 A1* | 4/2017 | Iannaccone | H04L 67/1095 |
| 2023/0344728 A1* | 10/2023 | Grover | H04L 67/535 |

* cited by examiner

*Primary Examiner* — Cao H Nguyen
(74) *Attorney, Agent, or Firm* — Fenwick & West LLP

(57) ABSTRACT

An online system dynamically determines time periods during which interaction data points are collected for application states being tested as part of an application state experiment. The online system collects interaction data points that occurred after a time when instructions were transmitted to apply the first application state and labels those with a state label corresponding to the first application state. When the online system detects that an interaction data minimum has been met, the online system transmits instructions to the client devices to present a user interface in accordance with a second application state. The online system applies a transition period between when the second set of instructions are transmitted and when the online system starts labeling interaction data points with a state label for the second application state. After the transition period, the online system labels interaction data points with state labels for the second application state.

20 Claims, 4 Drawing Sheets

ASSIGNING CONTROL AND VARIANTS TO DYNAMICALLY DEFINED TIME PERIODS IN APPLICATION STATE EXPERIMENTS

BACKGROUND

Online systems test new features or algorithms by comparing how users interact with content generated based on the new features or algorithms as compared to existing methods. Generally, online systems assign existing versions and new versions to preset time periods and present content to users based on the different versions during their respective time periods. For example, if an online system is testing a new user interface for a client application, the online system may test a control version of the user interface on one day and a test version on another day. However, by testing different versions during different time periods, online systems have difficulty controlling for differences between the time periods during which different versions are tested. For example, if versions are tested on different days, conditions like weather or days of week can change user interactions independently from the versions presented by the online system.

Online systems can increase how frequently it changes the presented versions to users so that versions are tested in more similar conditions. However, user interaction rates may still be impacted by the previous version for some time after the previous version was presented. Thus, online systems generally cannot use data collected between the periods when the presented version changes from one version to another, meaning that frequently changing between presented versions reduces how quickly the online system can collect sufficient data to determine the success of one version over another.

SUMMARY

In accordance with one or more aspects of the disclosure, an online system dynamically defines time periods during which interaction data points are collected for application states being tested as part of an application state experiment. The online system assigns application states to time periods within a testing time period. The length of each time period is dynamically defined based on the data collected for the assigned application state during the time period. When the collected data meets certain criteria for what data to collect during the time period (e.g., how much data to collect), the online system ends the current time period and transitions to the next time period, assigning another application state to that next time period. Between the time periods, the online system has a transition period during which collected data may be ignored, since client devices that are collecting the data for the experiment may not have shifted fully to a user interface for the new applications state yet.

To dynamically define time periods for application states that are part of an application state experiment, the online system receives data for an application state experiment for a client application of the online system. The data for that experiment includes application states that are being tested by the online system, where each application state is a different version of the functionality of the client application or the online system. The online system also receives interaction data criteria for the application state experiment, which indicates a minimum number of interaction data points to be collected by the online system for each application state.

The online system transmits instructions for client devices to present a user interface in accordance with a first application state of the application state experiment. The online system collects interaction data points that occurred after the time when the instructions were transmitted and labels those data points with a state label corresponding to the first application state. When the online system detects that the interaction data criteria has been met for the first application state, the online system transmits instructions to the client devices to present a user interface in accordance with a second application state of the application state experiment.

The online system applies a transition period between when the second set of instructions are transmitted and when the online system starts labeling interaction data points with a state label for the second application state. The transition period is a period during which the online system ignores interaction data points that were collected for the application state experiment. During this transition period, the online system may label the interaction data points with a state label corresponding to the transition period. After the transition period, the online system labels interaction data points with state labels for the second application state.

In some embodiments, each interaction data point is associated with an order placed by a user with the online system and the online system determines whether to label an interaction data point with a state label for the transition period based on when a critical step in a workflow for the order occurred. A critical step is a step in the order workflow that differs between two application states in the application state experiment. For example, if the tested application states include different navigation algorithms to be used by the online system for having pickers deliver orders, the critical step in the order workflow may be the delivery step. The online system may label an interaction data point based on when the critical step occurred. If the critical step occurred during the transition period, the online system may label interaction data points associated with the corresponding order with the transition period state label. Similarly, if the critical step occurred after the end of the transition period, the online system may associate the interaction data points with the state label for the second application state.

The online system may cycle through application states as the interaction data criteria is met for each of the application states. The online system may continue to collect interaction data points until the end of a testing time period for the application state experiment or until a threshold amount of data is collected. The online system computes a success metric for each of the application states based on their associated interaction data points, and may apply an application state to client applications based on the computed success metric.

By dynamically adjusting how long the online system collects data for each application state based on the interaction data minima, the online system can collect data for each application state during shorter time frames while still ensuring that it can collect sufficient data for each application state. These shorter time frames allow the online system to collect experimental data that is more directly comparable between different application states, since their testing time frames are more similar to each other. Furthermore, by labeling interaction data points based on when critical steps in orders occurred, the online system can effectively collect more interaction data points than traditional methods because the online system loses fewer interaction data points to transition periods.

DETAILED DESCRIPTION

Figure 1:
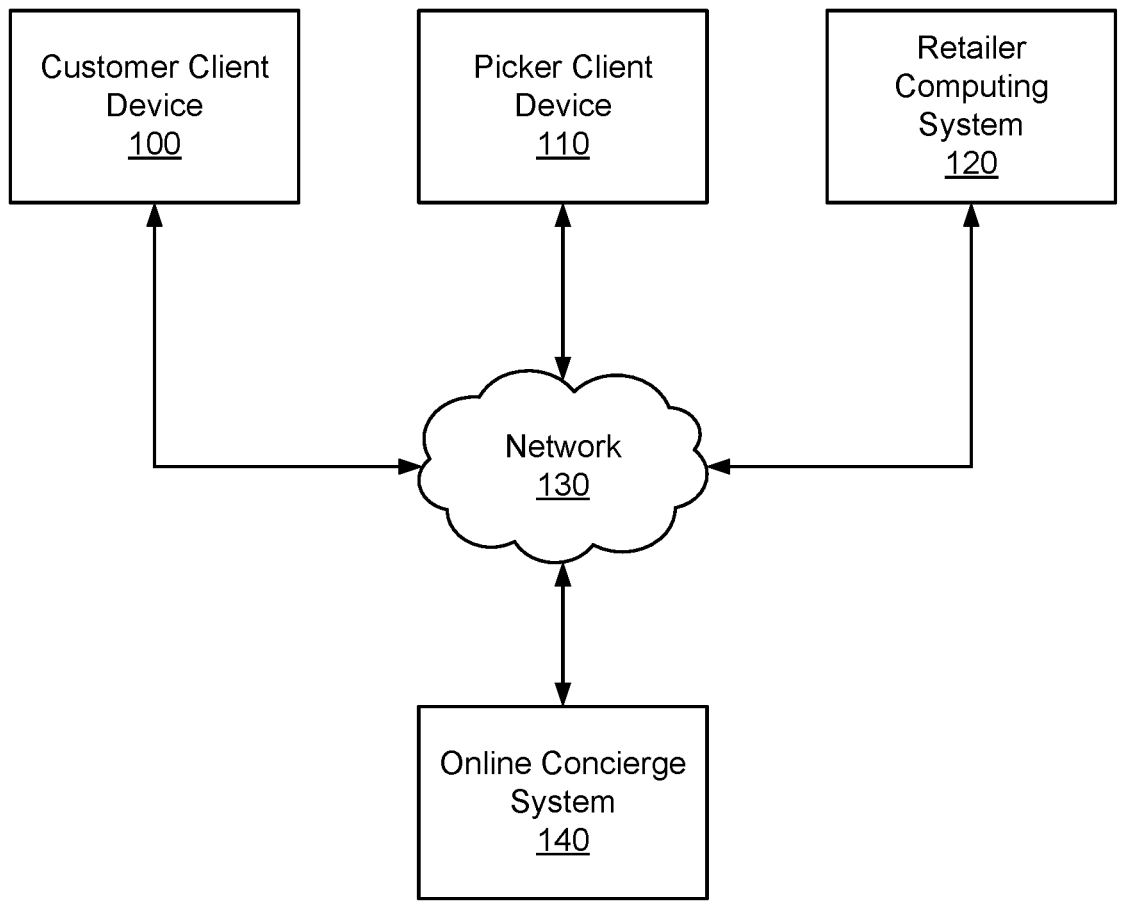
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
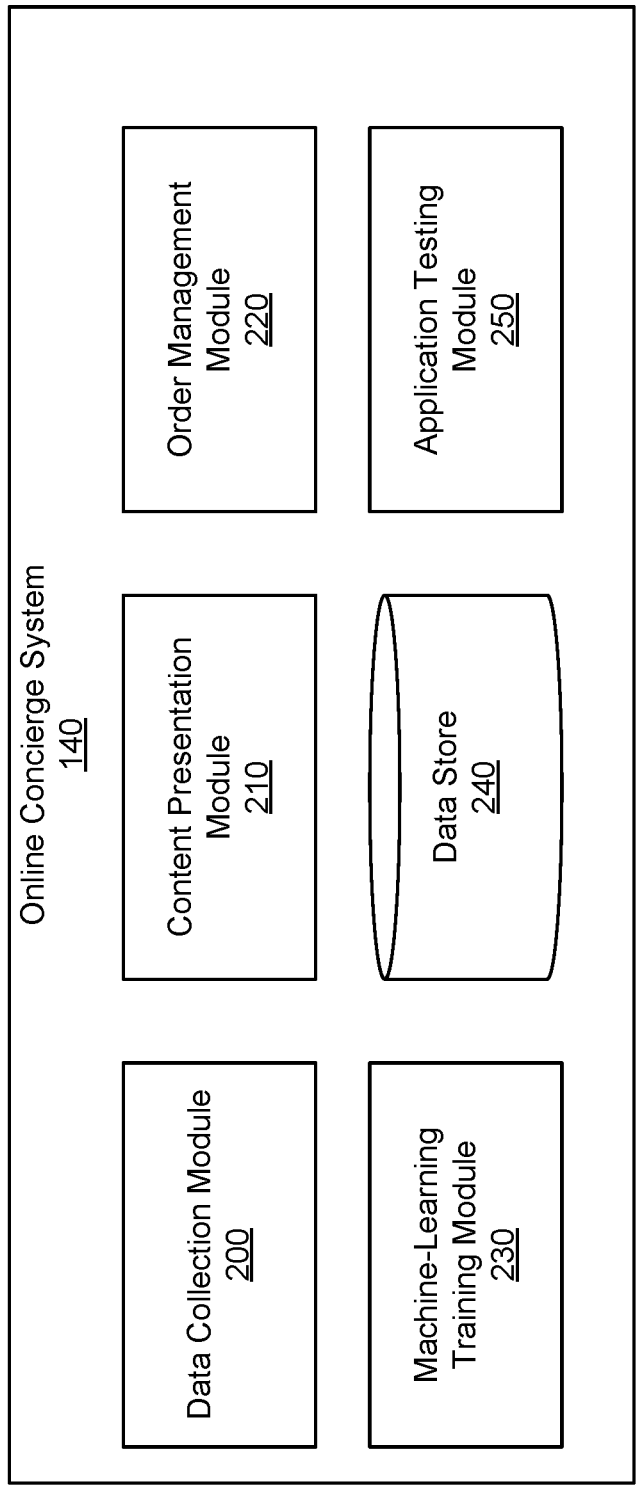
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, and an application testing module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, a person of ordinary skill in the art may identify which types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The application testing module 250 tests possible application states for client applications of the online concierge system. The application testing module 250 tests these possible applications by performing an application state experiment for a client application. For example, the application testing module 250 may transmit instructions to client applications operating on customer client devices, picker client devices, or retailer computing systems to present user interfaces in accordance with application states that are being tested by the online concierge system. The application testing module 250 dynamically determines time frames for collecting interaction data for the application states. An example method that may be performed by the application testing module 250 is described in further detail below.

Figure 3:
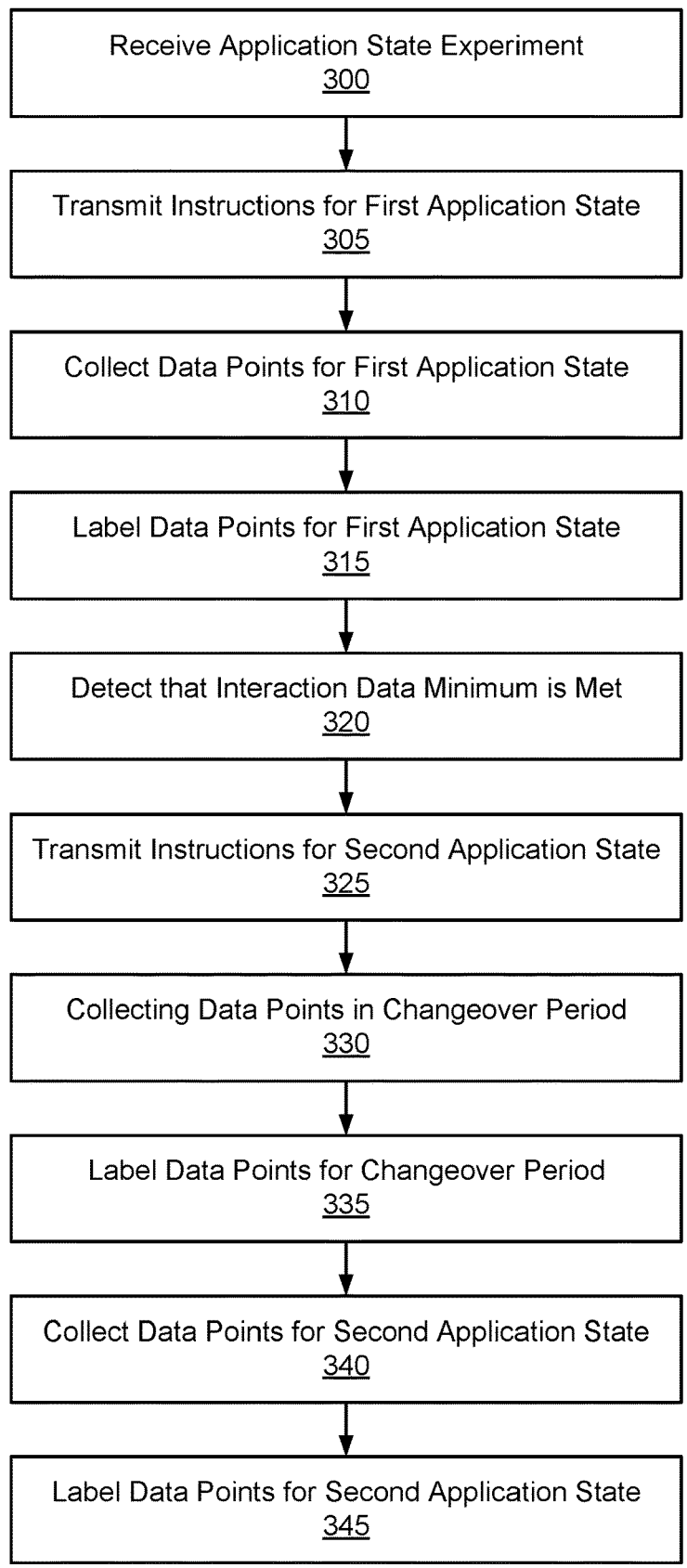
FIG. 3 is a flowchart for a method of dynamically determining time frames for collecting interaction data for the application states of a client application, in accordance with one or more embodiments.

FIG. 3 is a flowchart for a method of dynamically determines time frames for collecting interaction data for the application states of a client application, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system receives 300 data for an application state experiment from an operator of the online concierge system. An application state experiment is a test of the performance of a set of application states for a client application. Each application state is a version of a client application associated with the online concierge system, and each application state causes the client application to be executed differently according to the parameters, algorithms, or other functionality of the application state. An application state may impact the functionality of a client device executing the client application or the online concierge system that is in communication with the client application. For example, each application state may include parameters for the user interface of the client application that control what content is presented on the client application's user interface and how that content is presented. Similarly, each application state may correspond to different algorithms used by the online concierge system to select content to present to users through client applications. The set of application states for an application state experiment may include a control applications state and one or more test application states being tested by the online concierge system.

The application state experiment data includes a testing time period over which the experiment will be performed. The testing time period may specify a set of dates or times when the experiment should be performed or may indicate an intended duration of the experiment.

The application state experiment data also includes interaction data criteria for testing application states. The interaction data criteria are criteria for when the online concierge system ends a time period assigned to a first application state and starts to transition to another time period for another application state. For example, the interaction data criteria may include a minimum amount of data to be collected for each application state as part of the experiment. This minimum may be a minimum amount of time that each application state is tested on client applications or may be a minimum number of data points to be collected for each application state. Additionally, the interaction data criteria may include a minimum amount of data to collect for each application state over the course of the whole experiment (i.e., over the whole testing time period) or may include a minimum amount of data to collect in a continuous portion of the testing time period during which an application state is tested.

The online concierge system transmits 305 instructions to a set of client devices to use a first application state that is part of the application state experiment. The instructions cause the client applications to present user interfaces in accordance with the first application state. For example, where the first application state includes parameters for a new format for the client application's user interface, the instructions cause the client applications to present a user interface to a user in accordance with that new format. Similarly, where the first application state represents a new algorithm used by the online concierge system to select or generate content to present to a user (e.g., a new algorithm for selecting which items to present to a customer in response to a search query), the instructions may include the new content as selected or generated by the online concierge system to be presented through the user interface of the client application.

The online concierge system collects 310 interaction data points describing user interactions with the user interfaces presented to users in accordance with the first application state. An interaction data point describes a user's interaction with the client application. Interaction data points may correspond to users' selections of user interface elements. Similarly, interaction data points may indicate when a user reaches a particular stage of an application workflow and the data describing what actions the user has taken within that workflow. For example, for a workflow of a customer ordering items to be serviced by a picker, the online concierge system may collect interaction data points indicating queries submitted by the customer, items selected by the customer, order delivery options selected by the customer, whether a picker accepts or rejects the order, an amount of consideration provided to a picker for servicing the order, how long it takes the picker to service the order, or whether any issues occur during the servicing of the order. In some embodiments, the collected interaction data points correspond to a success metric for application states to be measured by the application state experiment. For example, if a new application state represents a new content selection algorithm for selecting items to present to users in response to a query, the success metric may be the rate at which users select the first few items presented as query results and the online concierge system may collect interaction data points that indicate which items a user selects for an order.

The online concierge system may collect interaction data points from interaction logs generated and maintained by client applications on client devices. The online concierge system also may collect interaction data points by generating its own interaction logs based on communications between the online concierge system and the client applications.

The online concierge system labels 315 the collected set of interaction data points with a state label that corresponds to the first application state. A state label is a label for an interaction data point that indicates the application state of a client application when the interaction data point was collected. By labeling the interaction data points with state labels, the online concierge system can identify which interaction data points correspond to the first application state and compute a success metric for the first application state based on those interaction data points.

As the online concierge system collects interaction data points, the online concierge system tracks whether the set of interaction data points meets the interaction data criteria. If the set of interaction data points corresponding to the first application state meets the interaction data criteria, the online concierge system detects 320 that the interaction data criteria is met and transmits 325 instructions to the client devices to operate according to a second application state for the application state experiment.

When the online concierge system transmits 325 the instructions, the online concierge system starts a transition period during which interaction data points are ignored. During this transition period, user interactions with the client application may still be impacted by the first application state so the interaction data points may not accurately reflect how users interact with the client application when operating according to the second application state. For example, a user may be presented with a first set of items in search results that were selected according to a selection algorithm used by the first application state. Then, for a subsequent query, the user may be presented with a second set of items in search results that were selected according to a different selection algorithm used by the second application state. If the online concierge system is measuring overall interaction rates with items throughout a user's ordering process, the interaction data points for the user's order may not accurately reflect interaction rates for the second application state.

The online concierge system collects 330 interaction data points during the transition period and labels 335 those data points with a state label corresponding to the transition period. The duration of transition periods may be set by the experiment data for the application state experiment. Alternatively, the online concierge system may determine a duration for the transition period. For example, the online concierge system may set the duration of the transition period based on how long it takes to get confirmations from client devices in response to transmitting the instructions to operate according to the second application state or based on when orders started before the transition period have been completed.

After the transition period ends, the online concierge system collects 340 interaction data points for the second application state and labels 345 those data points with a state label corresponding to the second application state. Like with the first application state, the online concierge system may monitor the interaction data points collected for the second application state and detect when the set of interaction data points meets the interaction data criteria. The online concierge system may similarly transmit instructions for client applications to operate according to a third application state, perform a transition period during which interaction data points are labeled with a corresponding state label, and then collect interaction data points for the third application state. The online concierge system may continually perform this method for the application states included in the application state experiment until the end of the testing time period.

The online concierge system uses the set of interaction data points collected for each of the application states to compute a success metric for each application state. The online concierge system may use these success metrics to select which application state to apply to client applications. As noted above, the online concierge system may not use interaction data points with state labels that correspond to a transition period.

In some embodiments, the online concierge system collects interaction data points as sets of data points that correspond to a particular order or batch of orders. For example, the online concierge system may receive a set of interaction data points that indicates which items a user selected when placing an order with the online concierge system. Similarly, the online concierge system may receive a set of interaction data points that indicates how long it took a picker to find and collect each item for a batch of orders. In these embodiments, the online concierge system may simply apply state labels to interaction data points based on a start time or a completion time of the corresponding orders. For example, the online concierge system may apply a state label corresponding to an application state to an interaction data point so long as the corresponding order was completed before the start of a transition period. Similarly, the online concierge system may apply a transition period state label to any order that started during the transition period.

Alternatively, in embodiments where the online concierge system collects sets of interaction data points that correspond to orders, the online concierge system may identify a timestamp for a critical step in the order and use that timestamp to determine a state label for interaction data points corresponding to the order. The application state experiment may include an indication of a critical step of an order workflow, where the critical step is a stage of the order workflow that is impacted by the experiment. For example, if the application state experiment was testing a new method for displaying directions to a picker that is delivering an order, the application state experiment may indicate that the delivery step is the critical step of the order workflow for the application state experiment. When the online concierge system collects these sets of interaction data points, the online concierge system identifies the timestamp of the critical step of the corresponding order and applies the state label based on that timestamp. For example, if an order is started during a transition period but the critical step occurs after a transition period, the online concierge system may label interaction data points corresponding to that order with a state label corresponding to the application state applied after the transition period.

Figure 4:
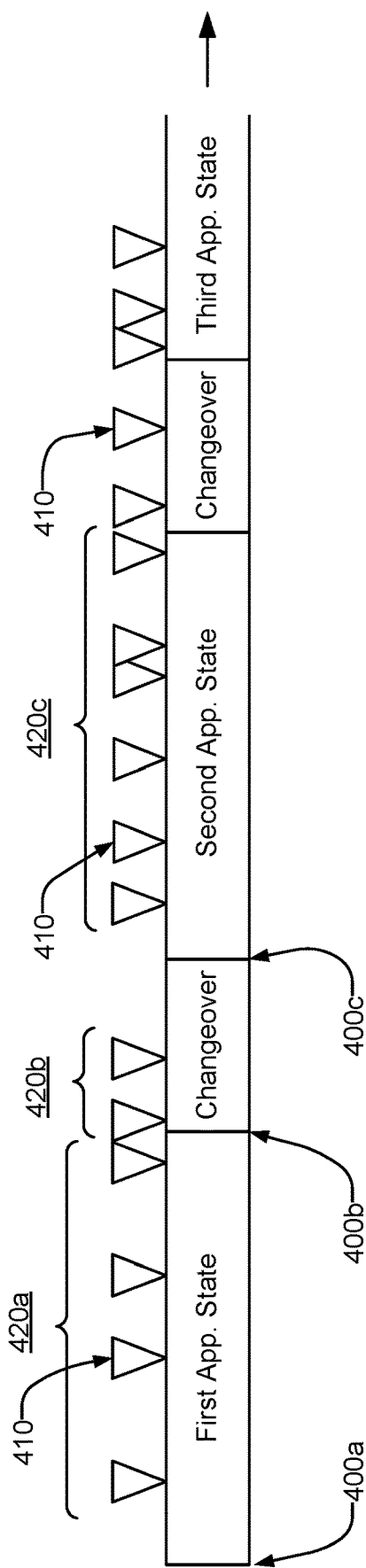
FIG. 4 illustrates an example labeling of interaction data points 410 with state labels, in accordance with one or more embodiments.

FIG. 4 illustrates an example labeling of interaction data points 410 with state labels, according to some embodiments. At a first time 400a, the online concierge system transmits instructions to client applications to operate according to a first application state. The online concierge system collects interaction data points 410 and tracks whether the set 420a of interaction data points collected for the first application state meet interaction data criteria. If the first set 420a of interaction data points meets this minimum, the online concierge system transmits, at a second time 400b, instructions to client applications to operate according to a second application state. The online concierge system collects further interaction data points that occur during a transition period and labels that second set 420b of interaction data points with a state label corresponding to the transition period. For interaction data points that occur after at a third time 400c after the end of the transition period, the online concierge system labels that third set 420c of interaction data points with a state label for the second application state.

The online concierge system may continually collect sets of interaction data points for application states (e.g., a third application state) until the interaction data criteria are met for each state. Similarly, the online concierge system may continually use transition periods between application states to ensure that interaction data points are representative of the application state of their corresponding state labels. The online concierge system may continue this process of cycling through application states until the testing time period for the application state experiment is met.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
   receiving data for an application state experiment for a client application of an online system, wherein the data for the application state experiment comprises a control application state for the client application, a test application state of the client application, a testing time period, and an interaction data criteria indicating a minimum number of interaction data points to be collected for each of the control application state and the test application state;
   conducting the application state experiment by, for each of a plurality of time periods within the testing time period:
      assigning one of: the control application state or the test application state to the time period;
      transmitting instructions to a plurality of client devices to cause the client application on the plurality of client devices to present a user interface in accordance with the assigned application state;
      collecting a set of interaction data points describing user interactions with the user interface of the assigned application state;
      ending the time period when the collected set of interaction data points meets the interaction data criteria; and
      collecting another set of interaction data points during a transition time period following the time period;
   computing a success metric for each of the control application state and the test application state based on the sets of interaction data points for the application states collected during the time periods, wherein the success metric is not computed based on the set of interaction data points collected during transition time periods
   transmitting instructions to a client device of the plurality of client devices to cause the client application on the client device to present a user interface in accordance with the control application state or the test application state based on the success metric.

2. The method of claim 1, wherein the interaction data criteria comprise a minimum number of interaction data points to be collected for an application state within a time period during which interaction data points are collected for the application state.

3. The method of claim 1, wherein the interaction data criteria comprise a minimum number of interaction data points to be collected for an application state during the testing time period.

4. The method of claim 1, wherein ending the time period comprises:
   detecting that the set of interaction data points meets the interaction data criteria by comparing the set of interaction data points to the interaction data criteria.

5. The method of claim 1, wherein computing the success metric for each of the control application state and the test application state comprises, for each application state:
   labeling interaction data points collected for the application state with a state label corresponding to the application state during each time period to which the application state was assigned;
   identifying a combined set of interaction data points for the application state based on the state label applied to the set of interaction data points; and
   computing a success metric for the application state based on the combined set of interaction data points.

6. The method of claim 1, further comprising:
   receiving a duration for the transition time period from an operator of the online system.

7. The method of claim 1, further comprising, for each of the plurality of time periods:
   transmitting instructions to the plurality of client devices to cause the plurality of client devices to present a user interface of the unassigned application state, wherein the instructions are transmitted after an end of the time period.

8. The method of claim 7, further comprising, for each of the plurality of time periods:
computing a duration for the transition period based on responses received from the plurality of client devices to the transmitted instructions to cause the client applications to present the user interface of the unassigned application state.

9. The method of claim 1, wherein collecting the other set of interaction data points during the transition time period comprises:
identifying an order corresponding to an interaction data point; and
adding the interaction data point to the set of interaction data points for the transition time period based on a start time or a completion time of the order.

10. The method of claim 1, wherein collecting the other set of interaction data points during the transition time period comprises:
identifying an order corresponding to an interaction data point;
identifying a timestamp for a critical step within a workflow of the order, wherein the critical step is a step within the workflow of the order that corresponds to the application state experiment; and
adding the interaction data point to the set of interaction data points for the transition time period based on the identified time stamp and the transition time period.

11. A non-transitory computer-readable medium storing instructions that, when executed by a processor, cause the processor to perform operations comprising:
receiving data for an application state experiment for a client application of an online system, wherein the data for the application state experiment comprises a control application state for the client application, a test application state of the client application, a testing time period, and an interaction data criteria indicating a minimum number of interaction data points to be collected for each of the control application state and the test application state;
conducting the application state experiment by, for each of a plurality of time periods within the testing time period:
assigning one of: the control application state or the test application state to the time period;
transmitting instructions to a plurality of client devices to cause the client application on the plurality of client devices to present a user interface in accordance with the assigned application state;
collecting a set of interaction data points describing user interactions with the user interface of the assigned application state;
ending the time period when the collected set of interaction data points meets the interaction data criteria; and
collecting another set of interaction data points during a transition time period following the time period;
computing a success metric for each of the control application state and the test application state based on the sets of interaction data points for the application states collected during the time periods, wherein the success metric is not computed based on the set of interaction data points collected during transition time periods
transmitting instructions to a client device of the plurality of client devices to cause the client application on the client device to present a user interface in accordance with the control application state or the test application state based on the success metric.

12. The non-transitory computer-readable medium of claim 11, wherein the interaction data criteria comprise a minimum number of interaction data points to be collected for an application state within a time period during which interaction data points are collected for the application state.

13. The non-transitory computer-readable medium of claim 11, wherein the interaction data criteria comprise a minimum number of interaction data points to be collected for an application state during the testing time period.

14. The non-transitory computer-readable medium of claim 11, wherein ending the time period comprises:
detecting that the set of interaction data points meets the interaction data criteria by comparing the set of interaction data points to the interaction data criteria.

15. The non-transitory computer-readable medium of claim 11, wherein computing the success metric for each of the control application state and the test application state comprises, for each application state:
labeling interaction data points collected for the application state with a state label corresponding to the application state during each time period to which the application state was assigned;
identifying a combined set of interaction data points for the application state based on the state label applied to the set of interaction data points; and
computing a success metric for the application state based on the combined set of interaction data points.

16. The non-transitory computer-readable medium of claim 11, wherein the operations further comprise:
receiving a duration for the transition time period from an operator of the online system.

17. The non-transitory computer-readable medium of claim 11, wherein the operations further comprise, for each of the plurality of time periods:
transmitting instructions to the plurality of client devices to cause the plurality of client devices to present a user interface of the unassigned application state, wherein the instructions are transmitted after an end of the time period.

18. The non-transitory computer-readable medium of claim 17, wherein the operations further comprise, for each of the plurality of time periods:
computing a duration for the transition period based on responses received from the plurality of client devices to the transmitted instructions to cause the client applications to present the user interface of the unassigned application state.

19. The non-transitory computer-readable medium of claim 11, wherein collecting the other set of interaction data points during the transition time period comprises:
identifying an order corresponding to an interaction data point; and
adding the interaction data point to the set of interaction data points for the transition time period based on a start time or a completion time of the order.

20. A system comprising a processor and a non-transitory computer-readable medium storing instructions that, when executed by the processor, cause the processor to perform operations comprising:
receiving data for an application state experiment for a client application of an online system, wherein the data for the application state experiment comprises a control application state for the client application, a test application state of the client application, a testing time period, and an interaction data criteria indicating a minimum number of interaction data points to be collected for each of the control application state and the test application state;

conducting the application state experiment by, for each of a plurality of time periods within the testing time period:

assigning one of: the control application state or the test application state to the time period;

transmitting instructions to a plurality of client devices to cause the client application on the plurality of client devices to present a user interface in accordance with the assigned application state;

collecting a set of interaction data points describing user interactions with the user interface of the assigned application state;

ending the time period when the collected set of interaction data points meets the interaction data criteria; and collecting another set of interaction data points during a transition time period following the time period;

computing a success metric for each of the control application state and the test application state based on the sets of interaction data points for the application states collected during the time periods, wherein the success metric is not computed based on the set of interaction data points collected during transition time periods transmitting instructions to a client device of the plurality of client devices to cause the client application on the client device to present a user interface in accordance with the control application state or the test application state based on the success metric.

* * * * *